United States Patent [19]

Allin et al.

[11] Patent Number: 5,750,237
[45] Date of Patent: May 12, 1998

[54] DOUBLE-FACED LINER BOARD

[75] Inventors: Gaylord Allin, W. Monroe; Mark Gorham, Shreveport, both of La.

[73] Assignee: Dallas Enviro-Tek International, Inc., Dallas, Tex.

[21] Appl. No.: 454,863

[22] Filed: May 31, 1995

[51] Int. Cl.$^6$ .................................................. B32B 3/28
[52] U.S. Cl. .......................... 428/182; 428/485; 428/486; 428/503; 428/507; 428/514; 428/526; 428/527; 428/702; 162/184.5
[58] Field of Search ........................... 428/182, 485, 428/507, 532, 913, 486, 503, 514, 521, 526, 527, 536, 702; 162/184.5, 184.4; 524/13, 530, 534

[56] References Cited

U.S. PATENT DOCUMENTS

| | | | |
|---|---|---|---|
| 2,548,802 | 4/1951 | Linscott | 260/85.1 |
| 3,033,708 | 5/1962 | McKee | 428/182 |
| 3,085,026 | 4/1963 | Weisgerber et al. | 117/60 |
| 3,308,006 | 3/1967 | Kresse et al. | 161/137 |
| 3,523,058 | 8/1970 | Shick | 161/133 |
| 3,791,856 | 2/1974 | Duling | 117/155 UA |
| 4,117,199 | 9/1978 | Gotoh et al. | 428/486 |
| 4,129,542 | 12/1978 | Matheson et al. | 260/28.5 |
| 4,315,830 | 2/1982 | French et al. | 252/182 |
| 4,556,603 | 12/1985 | Thorsrud | 428/283 |
| 4,569,968 | 2/1986 | Uffner et al. | 525/54.5 |
| 4,576,987 | 3/1986 | Cockatt et al. | 524/13 |
| 4,681,910 | 7/1987 | Crockatt et al. | 524/487 |
| 5,126,390 | 6/1992 | Duff | 524/276 |
| 5,232,987 | 8/1993 | Sakakibara et al. | 525/98 |
| 5,258,087 | 11/1993 | Symons | 428/182 |
| 5,285,957 | 2/1994 | Halsell | 428/182 |
| 5,308,896 | 5/1994 | Hansen et al. | 524/13 |
| 5,336,712 | 8/1994 | Austgen, Jr. et al. | 524/530 |
| 5,362,573 | 11/1994 | Pandian et al. | 428/511 |
| 5,447,977 | 9/1995 | Hansen et al. | 524/13 |
| 5,491,008 | 2/1996 | Soó et al. | 428/182 |

Primary Examiner—Donald Loney
Attorney, Agent, or Firm—Baker & Botts, L.L.P.

[57] ABSTRACT

A recyclable double-faced liner bard, the board having a top layer, a medium corrugated layer, and a bottom layer, the top layer having a coating formed from an aqueous composition comprising (A) an emulsion of a curable butadience-styrene copolymer and (B) $TiO_2$, the medium layer having a coating formed from an aqueous composition containing an emulsion of wax particles and a binder (preferably sodium alginate); and the bottom layer having a coating formed from an aqueous composition comprising about 10 to 85 percent by weight of a liquid curable styrene-butadiene copolymer (or a carboxylated copolymer) and wax.

5 Claims, 1 Drawing Sheet

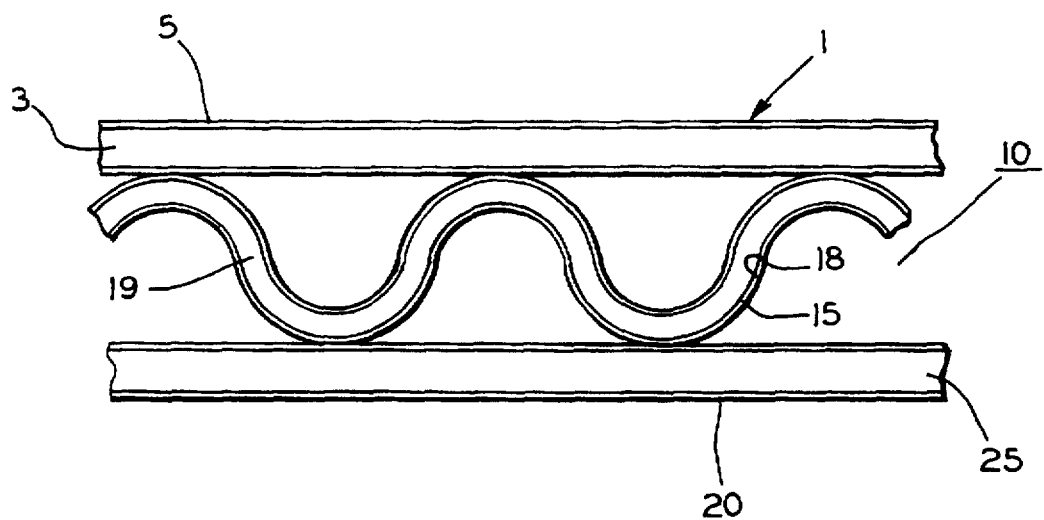

DOUBLE-FACED LINER BOARD

The present invention relates to a recyclable double-faced liner board that has strength, resistance to penetration by water vapor, and resistance to penetration by water.

BACKGROUND OF THE INVENTION

It is desirable to provide a double-faced liner board that is waterproof and yet, can be easily made and recycled in contract to boards waterproofed by wax.

Apparently articles (such as boxes) fabricated from double-faced liner boards, were coated on inside or outside surfaces to obtain waterproof properties. However, it was not feasible to recycle these liner board articles due to the wax.

OBJECTS OF THE INVENTION

It is an object of the present invention to provide a recyclable double-faced liner board, the board having a top layer, a medium corrugated layer, and a bottom layer, the top layer having a coating formed from an aqueous composition comprising (A) an emulsion of a curable butadience-styrene copolymer and (B) $TiO_2$, the medium layer having a coating formed from an aqueous composition containing an emulsion of wax particles and a binder (preferably sodium alginate); and the bottom layer having a coating formed from an aqueous composition comprising about 10 to 85 percent by weight of a liquid curable styrene-butadiene copolymer (or a carboxylated copolymer) and wax.

It is an object of the present invention to provide a double-faced liner board having a top layer with a cured, waterproof coating formed from an aqueous composition containing a liquid, curable styrene-butadience copolymer and $TiO_2$.

BRIEF DESCRIPTION OF THE DRAWING

These and other objects will be apparent from the specification that follows, the appended claims, and the drawings, in which:

The FIGURE is a fragmentary sectional view of a double-faced liner board of the present invention.

SUMMARY OF THE INVENTION

The present invention provides a double-faced liner board comprising a double-faced liner board comprising a top layer, a medium corrugated layer and a bottom layer, the top layer having a coating from a coating composition, suitable for coating a liner board, comprising an emulsion in water of (A) a prepolymer of a styrene-butadiene copolymer, and (B) $TiO_2$; the medium layer having a coating applied from an aqueous treating coating composition suitable for coating a middle corrugated layer of a double-faced liner board, the composition comprising (A) an emulsion of wax particles, and
(B) a binder that is
  (1) an alkali metal alginate, or
  (2) a solvent soluble styrene/acrylic copolymer, or
  (3) a mixture of the styrene/acrylic copolymer with a water-soluble melamine/formaldehyde prepolymer;

the bottom layer having a coating applied from an aqueous coating composition comprising (A) a latex of a styrene-butadiene copolymer or a latex of a carboxylated styrene-butadiene copolymer and (B) wax.

The present invention also provides a double-faced liner board as set forth above in which the top layer coating is applied from a composition in which the following ingredients are present in approximate % by weight:

| Ingredient | % by Weight |
| --- | --- |
| Butadiene-styrene copolymer emulsion (curable) | 44 |
| $TiO_2$ | 30 |
| Glycerin | 12; | the composition having a viscosity of about 9.3 to 10 (#3 Zahn) and a pH of about 9.8 to 10;

the medium layer is applied from a composition, a composition containing wax emulsion and a binder that is a mixture of 15 to 40% by weight of the composition of the styrene/acrylic copolymer and about 3 to 6% by weight of the composition of the melamine/formaldehyde prepolymer;

and the bottom layer is applied from an aqueous coating composition comprising the following ingredients in approximate percentages by weight:

| Ingredients | % by Weight |
| --- | --- |
| Styrene-butadiene copolymer | 70 |
| Sodium Alginate | 20 |
| Carnauba Wax | 5 |
| Polyethylene Wax | 5 | the composition having a pH of about 8.5 to 9 and a viscosity of about 12–13 (#3 Zahn).

DETAILED DESCRIPTION OF THE INVENTION

In the FIGURE, there is shown a double-faced liner board 1 having a top layer 3 with a waterproof top coating 5. Also shown is a medium corrugated layer 10 having a water resistant coating 15 preferably on one side 18 of the convoluted corrugated member 19.

Also shown is a bottom coating 20 on the outside of a bottom layer 25.

The top layer 3 and the bottom layer 20 are adhered to the middle layer 10 by suitable adhesives. An acrylic starch adhesive, sold by Sonoco is a preferred adhesive or glue.

The top layer coating is accomplisehd by a method of providing a water resistant, recyclable coating on a liner board, the method comprising applying to a surface of a liner board a thickness of about 0.1 to 5 mils of an aqueous coating composition consisting of an emulsion in water of (A) a curable prepolymer of a styrene-butadiene copolymer, and (B) $TiO_2$.

The top layer composition is easily applied to a substrate such as a liner board. The composition can be applied rapidly and the resultant coating formed merely by heating the composition to about 110° F. to 180° F. or above to form the waterproof coating.

The top layer composition can be used advantageously as a top coating of a double faced liner board, the composition being waterproof and being recyclable in contrast to wax coatings. The thickness of the coating is generally about 0.2 to 30 mils and preferably about 1 to 5 mils.

The coatings are measured for waterproof qualities by standard ASTM tests and TAPP tests including the Cobb test. A lower Cobb value such as 10 to 30 is generally preferred.

Moisture resistant tests are descirbed in the Gotoh U.S. Pat. No. 4,117,199 (Oji Paper Company, Ltd.). Suitable wax emulsion and meltects of coatings are also described. The patent is incorporated by reference.

The amounts of the copolymer in the top layer coating composition is generally about 30 to 60% by wt., preferably about 40 to 50% by wt., and optimally, about 44 to 45% by wt. The TiO$_2$ is generally about 20–400 mesh and preferably 200 to 325 mesh in diameter. The amount of butadiene in the copolymer is generally about 25 to 40 percent by weight and preferably about 30 to 35 percent by weight. The optimum amount is generally about 32–33 percent by weight.

The top layer coating pre-polymer can be cured or crosslinked with crosslinking agents such as acrylamides including N-methanol acrylamide. A suitable pre-polymer of a styrene-butadiene copolymer is sold by B.F. Goodrich to Specialty Chemical Division and distributed under the product name: WRL 706S1.

The following examples illustrate the top layer coatings.

EXAMPLE 1

An aqueous composition was prepared by mixing the following ingredients in approximate percents by weight:

| Ingredients | % by Weight |
| --- | --- |
| Butadiene-styrene copolymer emulsion (curable) | 44 |
| TiO$_2$ | 30 |
| Glycerin | 12 |

The viscosity of the composition was about 9.5 (No. 3 Zahn) and the pH was about 10.1.

The composition was applied to a substrate to form, when heated, a waterproof coating. The coating was recyclable.

EXAMPLE 2

A composition was made as set forth in Example 1 except that 1 to 20% by weight of additional ingredients including calcium stearate, potassium phosphate, a wetting agent and a defoamer.

Results similar to that of the composition and coating of Example 1 were obtained.

The wax particles in the medium coating composition are generally about 0.1 to 150 microns and preferably 1 to 100 microns in diameter. The amount of wax is generally about 40 to 98 percent by weight of the composition and preferably about 50 to 75 percent by weight, the optimum amount for most applications being about 65 to 75 percent by weight. A suitable wax particle emulsion is Aquabead 325-E™ wax (65 percent total paraffin solids).

Suitable binders for the medium coating are an alkali metal alginate (preferably sodium alginate) a solvent soluble styrene/acrylic copolymer and a mixture of the styrene/acrylic copolymer and a water-soluble melamine/formaldehyde prepolymer. The binder is generally about 2 to 40 percent by weight, preferably 10 to 35 percent by weight; and more preferably 22 to 32 percent by weight of the composition. A suitable acrylic/styrene copolymer is P-158™ copolymer.

In the medium coating composition, a suitable melamine/formaldehyde prepolymer is Cymel 303™, there being cross-linking groups to cure the melamine/formaldehyde polymer. A preferred hexamethoxymethylmelamine material cross-linker is CYMEL™ 303 (Cyanamid).

Generally, the viscosity of the medium coating composition at 78°–82° F. is about 13.5 to 15.5 sec (#3 Zahn) and the pH is about 8.9 to 9.2.

The water resistance and other properties were measured by standard ASTM or TAPP1 test methods including a Cobb test. The low Cobb values of 0.1 to 35 obtained are generally under 30 and preferably under 15.

The following illustrate aqueous medium coating compositions.

EXAMPLE 3

A formulation providing a waterproof coating was prepared from a composition as follows:

| Ingredient | % by Weight |
| --- | --- |
| Wax particle emulsion | 71.5 |
| Sodium Alginate | 24 |

The composition formed a coating on a liner board that was waterproof.

EXAMPLE 4

| Ingredient | % by Weight |
| --- | --- |
| Wax particle emulsion | 68.4 |
| Styrene acrylic prepolymer | 26.5 |
| Melamine/formaldehyde prepolymer | 5.0 |

The composition was applied to a substrate to form a waterproof coating.

The bottom coating composition is easily applied to a substrate such as a liner board. The composition can be applied rapidly and the resultant coating formed merely by heating the composition to about 110° F. to 180° F. or above to form the waterproof coating.

The composition can be used advantageously as a bottom coating of a bottom layer of a double-faced liner board, the composition being waterproof and being recyclable in contrast to wax coatings.

The thickness of the coating is generally about 0.2 to 30 mils and preferably about 1 to 5 mils.

The amounts of the copolymer in the bottom coating composition is generally about 30 to 85 percent by weight, preferably about 70 to 75 percent by weight, and optimally, about 68 to 72 percent by weight. The amount of butadiene in the copolymer is generally about 25 to 40 percent by weight and preferably about 30 to 35 percent by weight. The optimum amount is generally about 32–33 percent by weight. The pre-polymer or the carboxylated pre-polymer can be cured or crosslinked with, for instance, crosslinking agents such as acrylamides including N-methanol acrylamide.

A suitable pre-polymer of a styrene-butadiene copolymer for the bottom composition is sold by Rhone-Poulene, Specialty Chemical Division under the product name: WRL 706S1.

A suitable carboxylated styrene-butadiene latex is sold by Reichhold as Tylac™ Resin Emulsion 97757-02.

In general, the carboxylated copolymer is made by reaction with an unsaturated carboxylic acid such as maleic acid or methacrylic acid.

The alkali metal alginate is preferably sodium alginate although potassium and lithium can be used as the alkali metal.

The polyethylene is a liquid (non-solid) low molecular polyethylene having a molecular weight of 2500 or lower—say 1000 or so. Chem Cor 260 can be used.

The liquid carnauba wax helps give the resultant coating body and the wax is commercially available. A liquid emulsion of wax, including polyethylene wax, can be used in addition to the alginate or polyethylene as minor additives.

The following illustrates the bottom layer coating compositions.

EXAMPLE 5

An aqueous coating composition was prepared by mixing the following ingredients in approximate percent by:

| Ingredient | % by Weight |
| --- | --- |
| Styrene-butadiene copolymer (33% by weight butadiene emulsion — curable) | 70 |
| Sodium Alginate | 20 |
| Carnauba Wax | 5 |
| Polyethylene | 5, | the resulting composition had a pH of about 8.5 to 9 and a viscosity of about 12–13 (#3 Zahn).

The composition was applied to a liner board substrate to form, when heated, a waterproof coating. The coating was recyclable.

EXAMPLE 6

A composition was made as in Example 5 except that a carboxylated styrene-butadiene (33% butadiene) copolymer was used instead of the styrene-butadiene copolymer.

Substantially equivalent results were obtained.

The Gotoh et al. U.S. Pat. No. 4,117,199 mentions a thermoplastic (uncured) styrene-butadiene copolymer to provide a thermoplastic polymer coating. The patent discloses, at its main thrust, a coating composition containing a styrene-methylmethacrylate copolymer latex and a wax emulsion to provide a low water vapor permeability, a low degree of defibering and a high degree of water resistance. Example 15, apparently to show a less desirable coating composition, discloses a mixture of a styrene (35% styrene) butadiene copolymer latex—100 parts by weight and 13 parts by weight of wax emulsion. The skilled person would be led away from an aqueous bottom layer composition containing 85% by weight of a styrene-butadiene copolymer and a 15 percent by weight of a wax emulsion (with sodium alginate), because Example 15 shows poor water vapor permeability and poor defibering compound compared to the superior main thrust butadiene-methyl methacrylate copolymer/wax composition.

What is claimed is:

1. A double-faced liner board comprising a top layer, a medium corrugated layer and a bottom layer, the top layer having a coating from a coating composition suitable for coating a liner board comprising an emulsion in water of (A) a curable prepolymer of a styrene-butadiene copolymer, and (B) $TiO_2$;

the medium layer having a coating applied from an aqueous treating coating composition suitable for coating a middle corrugated layer of a double-faced liner board, the composition comprising (A) an emulsion of wax particles, and
(B) a binder that is
 (1) an alkali metal alginate, or
 (2) a solvent soluble styrene/acrylic copolymer, or
 (3) a mixture of the styrene/acrylic copolymer with a water-soluble melamine/formaldehyde prepolymer;

the bottom layer having a coating applied from an aqueous coating composition comprising (A) a latex of a styrene-butadiene copolymer or a latex of a carboxylated styrene-butadiene copolymer and (B) wax.

2. A board as defined in claim 1, wherein in the top layer coating composition, the copolymer emulsion is present in about 40% to 50% by weight and the $TiO_2$ is present in about 25% to 45% by weight.

3. A board as defined in claim 1, wherein in the medium layer coating composition, the binder is a mixture of 15 to 40% by weight of the composition of the styrene/acrylic copolymer and about 3 to 6% by weight of the composition of the melamine/formaldehyde prepolymer.

4. A board as defined in claim 1, wherein in the top layer coating composition, the following ingredients are present in approximate % by weight:

| Ingredient | % by Weight |
| --- | --- |
| Butadiene-styrene copolymer emulsion | 44 |
| $TiO_2$ | 30 |
| Glycerin | 12; | the composition having a viscosity of about 9.3 to 10 (#3 Zahn) and a pH of about 9.8 to 10.; wherein in the medium layer coating composition the binder is a mixture of 15 to 40% by weight of the composition of the styrene/acrylic copolymer and about 3 to 6% by weight of the composition of the melamine/formaldehyde prepolymer; and the bottom layer is applied from an aqueous coating composition comprising the following ingredients in approximate percentages by weight:

| Ingredients | % by Weight |
| --- | --- |
| Styrene-butadiene copolymer | 70 |
| Sodium Alginate | 20 |
| Carnauba Wax | 5 |
| Polyethylene | 5 | the composition having a pH of about 8.5 to 9 and a viscosity of about 12–13 (#3 Zahn).

5. A double-faced liner board comprising a top layer, a medium corrugated layer and a bottom layer, the top layer having a coating from a composition, a coating composition suitable for coating a liner board comprising an emulsion in water of (A) a prepolymer of a styrene-butadiene copolymer, and (B) $TiO_2$;

the medium layer having a coating applied from a composition, an aqueous treating coating composition suitable for coating a middle corrugated layer of a double-faced liner board, the composition comprising (A) an emulsion of wax particles, and
(B) a binder that is
 (1) an alkali metal alginate, or
 (2) a solvent soluble styrene/acrylic copolymer, or
 (3) a mixture of the styrene/acrylic copolymer with a water-soluble melamine/formaldehyde prepolymer;
the bottom layer having a coating applied from an aqueous coating composition comprising (A) a latex of a styrene-butadiene copolymer or a latex of a carboxylated styrene-butadiene copolymer and (B) wax.

* * * * *